United States Patent [19]

Piers

[11] 4,049,295
[45] Sept. 20, 1977

[54] COUPLINGS FOR METAL TUBES

[76] Inventor: Eugène Piers, 168 Blvd. Magenta, 75010 Paris, France

[21] Appl. No.: 676,379

[22] Filed: Apr. 13, 1976

[30] Foreign Application Priority Data

June 27, 1975 France .................. 75.20236

[51] Int. Cl.² .......................... F16L 55/00
[52] U.S. Cl. .................. 285/9 M; 285/331; 285/332
[58] Field of Search ............ 285/9 M, 9 R, 332, 331

[56] References Cited

U.S. PATENT DOCUMENTS

| | | | |
|---|---|---|---|
| 2,453,669 | 11/1948 | Meneses | 285/332 |
| 2,922,663 | 1/1960 | Wolf | 285/9 R |
| 3,151,695 | 10/1964 | Mintz | 285/9 M X |
| 3,181,895 | 5/1965 | Cator | 285/9 M |
| 3,269,608 | 8/1966 | Weber | 285/9 M X |

FOREIGN PATENT DOCUMENTS

| | | | |
|---|---|---|---|
| 1,236,595 | 6/1960 | France | 285/332 |
| 492,612 | 3/1929 | Germany | 285/9 M |
| 2,019,293 | 11/1970 | Germany | 285/9 M |

Primary Examiner—Thomas F. Callaghan
Attorney, Agent, or Firm—George H. Mitchell, Jr.

[57] ABSTRACT

A fluid-tight coupling for the end to end connection of metal tubes consists essentially of a conical male element and a conical female element fixed to the end of a respective tube, at least one of said elements being constituted by a permanent magnet.

1 Claim, 1 Drawing Figure

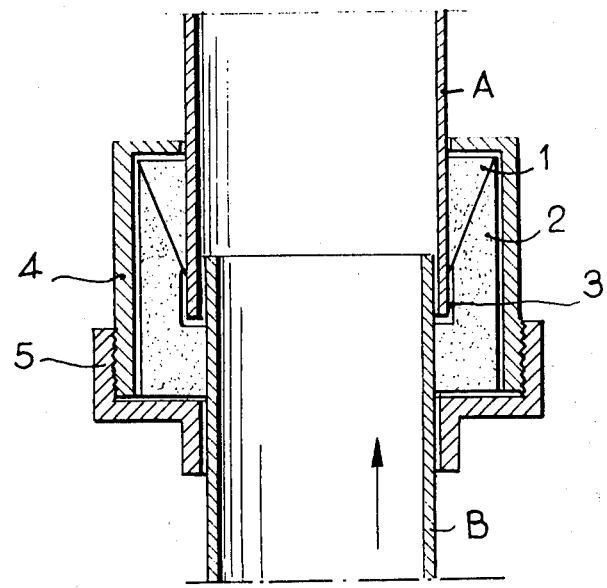

COUPLINGS FOR METAL TUBES

FIELD OF THE INVENTION

This invention relates to a fluid-tight coupling between metal tubes, which coupling is adapted to operate automatically and to constitute a safety device against leaks.

BACKGROUND OF THE INVENTION

It is known that fluid-tightness can be established between tubes carrying fluids, especially gases, by fixing complementary conical metal elements to the tubes, these elements being held tightly against one another in the sealing position by means of a twopart casing.

Numerous accidents occur every year as a result of loosening of the two parts of such a casing, for example under the effect of vibration.

In addition, fluid-tightness requires that the screwthread by which the two halves are assembled should be cut very accurately. This accuracy is goverened by various national Standards, for example, French Standard NF 03004 (October, 1970), such accurancy involves precision machining and, hence, additional cost.

In another field of use, it has already been proposed to avoid the premature loosening of the two coupling elements by providing them with a permanent magnet, fluid-tightness being obtained by traditional plastic elements. See, for instance, U.S. Pat. No. 2793057.

One object of the present invention is to provide a novel fluid-tight coupling. Aother object is to provide a novel fluid-tight coupling which can be assembled easily and which provides for easy alignment of the tubes to be connected.

STATEMENT OF THE INVENTION

According to the instant invention, the conical elements themselves guarantee their mutual fluid-tightness, their alignment and their contact without any need for an external retention casing, the casing, if any is provided, merely acting as a guard.

The present invention provides a fluid-tight saftey coupling for metal tubes comprising a male conical metal element fixed to a first tube and a female conical metal element fixed to a second tube, said male and female conical metal elements having surfaces constituting cones of identical pitch at least one of said elements being a permanent magnet, and the other of said elements being made from ferrous material selected from the group consisting of non-magnetized ferrous material and permanently magetized ferrous material.

DESCRIPTION OF THE DRAWNG

The instant invention is described in more detail below with reference to the accompanying Drawings which is section through a sealing and safety coupling according to the invention.

In the said Drawing, A denotes a first tube, B denotes a second tube, 1 denotes a conical male metal element afixed to said first tube, 2 denotes a conical female metal element afixed to said second tube, 3 denotes a cylindrical recess in said female element, and 4 and 5 denote the parts of a two part housing surrounding said male and female elements.

DESCRIPTION OF THE PREFERRED EMBODIMENT

In accordance with the instant invention, it will be seen by reference to the Drawing, that the coupling which is intended to joint the tubes A and B, is formed by the conical male element 1 fixed to the tube A and by the conical female element 2 fixed to the tube B, these two elements of strictly complementary conicity being each made of a magnetic metal such as a permanent magnet.

By virtue of their mutual attraction, these two elements between them automaticlly guarantee their alignment, their contact and their gas-or liquid-tightness in an entirely satisfactory manner.

This attraction prevents any premature separtion, even if the tubes are not joined together by other means.

The coupling according to the instant invention may be used both for tubes placed end to end, and for partially overlapping tubes (as in the accompanying Drawings). In the latter case, it is necessary to leave a space between the ends to ensure that the joint between the elements is made correctly. To this end, the element 2 is provided with the cylindrical recess 3 at the narrow end of the female element.

The coupling according to the instant invention may be protected against shocks by means of the housing in two parts 4 and 5, which screw onto one another without however providing any fluid-tightness.

Although this invention has been illustrated by reference to a specific embodiment, it will be apparent to those skilled in the art that various changes and modifications may be made which fall within the scope of this invention.

I claim:

1. A fluid-tight saftey coupling for metal tubes comprising a male conical metal element fixed to a first tube and a female conical metal element fixed to a second tube, said male and female metal elements having surfaces constituting cones of identical pitch, both of said elements being permanent magnets, the female element being formed with a cylindrical recess coaxial with the said female element and located at the narrow end of said female element to receive the end of said first tube therein, in overlapping relation to the end of said second tube.

* * * * *